United States Patent [19]

Handte et al.

[11] 4,283,637
[45] Aug. 11, 1981

[54] SIGNAL GENERATOR

[75] Inventors: Herbert Handte, Filderstadt; Friedrich Kollmar, Grafenau, both of Fed. Rep. of Germany

[73] Assignee: MOOG GmbH, Böblingen, Fed. Rep. of Germany

[21] Appl. No.: 99,644

[22] Filed: Dec. 3, 1979

Related U.S. Application Data

[62] Division of Ser. No. 507, Jan. 2, 1979, Pat. No. 4,217,635.

[30] Foreign Application Priority Data

Jan. 5, 1978 [DE] Fed. Rep. of Germany ....... 2800441

[51] Int. Cl.³ .............................................. H03K 4/08
[52] U.S. Cl. .................................. 307/228; 307/261; 307/490; 328/181; 307/503
[58] Field of Search .............. 307/228, 229, 230, 261; 328/181, 184, 35

[56] References Cited

U.S. PATENT DOCUMENTS

| | | | |
|---|---|---|---|
| 3,633,643 | 1/1972 | Anthony | 307/228 |
| 3,649,845 | 3/1972 | Foch | 328/181 |
| 3,781,693 | 12/1973 | Ford | 307/230 |
| 4,030,039 | 6/1977 | Fahlgren | 307/229 |

Primary Examiner—Stanley D. Miller, Jr.
Assistant Examiner—B. P. Davis
Attorney, Agent, or Firm—Sommer & Sommer

[57] ABSTRACT

A control circuit is adapted to control the movement of a pintle relative to the die head of extrusion apparatus. A command signal is supplied to a signal generator, which produces a first output signal in the form of a series of continuous voltage triangles, and a second output signal in the form of unit pulses. An impedance matrix contains a plurality of potentiometers which may be remotely connected to a summing amplifier. The potentiometers are arranged in a numerical order. Odd-numbered potentiometers are supplied with the triangular output signal from the signal generator. Even-numbered potentiometers are supplied with the signal generator triangular output signal, but which has been phase-shifted by half the width of one triangle. The pulse output from the signal generator is supplied to a decoder, which successively connects pairs of numerically-adjacent potentiometers with the summing amplifier during overlapping time intervals. During the cycle of operation, only a pair of numerically-adjacent potentiometers will be connected to the summing amplifier at any point in time. The output of the summing amplifier is a control signal, which may be used to control the movement of a pintle relative to a die head.

5 Claims, 13 Drawing Figures

TABLE I

| | P1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | P25 |
|---|---|---|---|---|---|---|---|---|---|---|---|---|---|---|---|---|---|---|---|---|---|---|---|---|---|
| 1 | − | o | o | o | o | | | | | | | | | | | | | | | | | | | | |
| 2 | − | − | o | o | o | o | | | | | | | | | | | | | | | | | | | |
| 3 | o | − | − | o | o | o | o | | | | | | | | | | | | | | | | | | |
| 4 | o | o | − | − | o | o | o | o | | | | | | | | | | | | | | | | | |
| 5 | o | o | o | − | − | o | o | o | o | | | | | | | | | | | | | | | | |
| 6 | o | o | o | o | − | − | o | o | o | o | | | | | | | | | | | | | | | |
| 7 | | o | o | o | o | − | − | o | o | o | o | | | | | | | | | | | | | | |
| 8 | | | o | o | o | o | − | − | o | o | o | o | | | | | | | | | | | | | |
| 9 | | | | o | o | o | o | − | − | o | o | o | o | | | | | | | | | | | | |
| 10 | | | | | o | o | o | o | − | − | o | o | o | o | | | | | | | | | | | |
| 11 | | | | | | o | o | o | o | − | − | o | o | o | o | | | | | | | | | | |
| 12 | | | | | | | o | o | o | o | − | − | o | o | o | o | | | | | | | | | |
| 13 | | | | | | | | o | o | o | o | − | − | o | o | o | o | | | | | | | | |
| 14 | | | | | | | | | o | o | o | o | − | − | o | o | o | o | | | | | | | |
| 15 | | | | | | | | | | o | o | o | o | − | − | o | o | o | o | | | | | | |
| 16 | | | | | | | | | | | o | o | o | o | − | − | o | o | o | o | | | | | |
| 17 | | | | | | | | | | | | o | o | o | o | − | − | o | o | o | o | | | | |
| 18 | | | | | | | | | | | | | o | o | o | o | − | − | o | o | o | o | | | |
| 19 | | | | | | | | | | | | | | o | o | o | o | − | − | o | o | o | o | | |
| 20 | | | | | | | | | | | | | | | o | o | o | o | − | − | o | o | o | o | |
| 21 | | | | | | | | | | | | | | | | o | o | o | o | − | − | o | o | o | o |
| 22 | | | | | | | | | | | | | | | | | o | o | o | o | − | − | o | o | o |
| 23 | | | | | | | | | | | | | | | | | | o | o | o | o | − | − | o | o |
| 24 | | | | | | | | | | | | | | | | | | | o | o | o | o | − | − | o |
| 25 | | | | | | | | | | | | | | | | | | | | o | o | o | o | − | − |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| A | o | o | o | o | o | o | o | o | o | o | o | o | o | o | o | − | − | − | − | − | − | − | − | − | − |
| B | − | − | − | − | − | − | − | − | o | o | o | o | o | o | o | o | o | o | o | o | o | o | o | o | − |
| C | − | − | − | − | o | o | o | o | o | − | − | − | − | − | − | − | − | − | − | − | o | o | o | o | o |
| D | − | − | o | o | o | o | − | − | − | − | o | o | o | o | − | − | − | − | o | o | o | o | − | − | − |
| E | − | o | o | − | − | o | o | − | − | o | o | − | − | o | o | − | − | o | o | − | − | o | o | − | − |

SIGNAL GENERATOR

This is a divisional application of pending application Ser. No. 000,507, filed Jan. 2, 1979 now U.S. Pat. No. 4,217,635, issued Aug. 12 1980.

BACKGROUND OF THE INVENTION

1. Field of the Invention

The present invention relates generally to apparatus for controlling the operation of extrusion apparatus, and more particularly to an improved circuit for controlling the movement or position of a pintle relative to an extrusion die head.

2. Description of the Prior Art

In the manufacture of a blow-molded article, such as a bottle or the like, a parison is initially extruded through a variable orifice between a movable pintle and a die head, and is subsequently inflated to the desired configuration in a blow mold. When designing the shape of the initial parison, one should consider the shape of the ultimate blow-molded article. Hence, the wall thickness of the parison may vary considerably along its extruded length. This is accomplished in known extrusion apparatus by providing a pintle or mandrel which is mounted for movement relative to a die head so as to vary the width of the annular gap or orifice therebetween. Hence, the pintle may be selectively moved relative to the die head according to a programmed sequence, to provide a parison profile having a desired wall thickness at different locations along its extruded length.

German Offenlegungsschrift No. 2,445,394 (corresponding to U.S. Pat. No. 3,865,528) discloses a method of producing an electrical control signal for controlling the position of the pintle relative to the die head. This known method provides an electrical control circuit which includes an impedance matrix with a plurality of potentiometers, which may be used to produce a progression approximating the desired control function. This recognizes that a progression can be formed by superimposing triangular signals which overlap one another in time. For this purpose, triangular voltages are successively supplied to the potentiometers of the impedance matrix. The height of each triangle varies with the voltage appearing at the middle tap of the potentiometer. The modified voltages of adjacent triangles are then summed by superposition. In this known structure, each potentiometer is provided with its own individual signal generator, which produces a wave form in the form of a plurality of continuous voltage triangles. Each signal generator is supplied with the command signal, which is either derived directly from the pintle position, or independently generated and synchronized with the cycle of the pintle movement.

A drawback of this known control circuit is that a separate signal generator is required for each potentiometer in the impedance matrix. For example, for a twenty-five point programmer (i.e. one capable of producing a polygon with twenty-five corners), twenty-five of such signal generators are required. Since a single signal generator is relatively expensive, the entire control circuit becomes both expensive and unnecessarily large. In addition, tolerances between individual signal generators have a delitescent effect on total circuit function and performance.

SUMMARY OF THE INVENTION

The present invention provides an improved control circuit which is arranged to receive a command signal input and is operative to produce a control signal output, which is particularly adapted for use in controlling the movement of a pintle relative to the head of an extrusion die; and also provides an improved signal generator, which is particularly adapted for use in such a control circuit.

The improved signal generator is arranged to be supplied with a command signal input and is operative to produce a first output signal in the form of a series of continuous voltage triangles. The signal generator broadly comprises at least one signal converter, which has a level symmetrizing circuit arranged to receive the command signal input and is operative to amplify and symmetrize the same, and a rectifier circuit arranged to receive the output of the level symmetrizing circuit and operative to provide a full wave rectified signal of such amplified and symmetrized signal. The signal generator may also include a pulse circuit associated with the rectifier circuit for producing a second output signal in the form of a plurality of pulses corresponding to a signal in the rectifier circuit. In the preferred embodiment, the signal generator includes a plurality of signal converters, connected as a chain, such that a rectifier output signal from a preceeding signal converter is supplied as an input signal to the level symmetrizing circuit of the next successive signal converter.

The improved control circuit broadly includes: a signal generator arranged to be supplied with the command signal and operative to produce a first output signal in the form of a series of continuous voltage triangles; a complement circuit arranged to receive the signal generator triangular output signal and operative to shift the phase of same by half the width of one triangle; an impedance matrix having a plurality of potentiometers arranged in a numerical order, odd-numbered potentiometers being continuously supplied with the triangular output signal from the signal generator, even-numbered potentiometers being continuously supplied with the phase-shifted triangular signal from the complement circuit; a summing amplifier connected to each potentiometer and operative to produce a control signal representative of the summed signals received from the potentiometers; a corresponding plurality of normally-open switches, each switch being operatively associated with a potentiometer and arranged to interrupt the signal from the associated potentiometer to the summing amplifier; and sequencing means operative to selectively close each switch sequentially during overlapping time intervals such that only two numerically-adjacent potentiometers in the order will be connected to the summing amplifier at any time during the cycle of operation.

In the preferred embodiment, the control circuit includes the improved signal generator. The pulse output of the signal generator is supplied to a decoder, which remotely closes the switches in the desired sequence.

Accordingly, one general object is to provide an improved signal generator, which is arranged to receive a command signal and is operative to produce an output signal in the form of a series of continuous voltage triangles.

Another object is to provide such an improved signal generator for use in a control circuit.

Another object is to provide an improved control circuit which is adapted to receive a command signal, and which is operative to produce a desired control signal.

Another object is to provide such an improved control circuit which is particularly adapted for use in controlling the movement of a pintle relative to the die head of extrusion apparatus.

These and other objects and advantages will become apparent from the foregoing and ongoing written specification, the drawings, and the appended claims.

BRIEF DESCRIPTION OF THE DRAWINGS

Table I shows the relationship between input signals A–E and output signals P1–P25.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification, of which this detailed description is an integral part.

Figure 1:
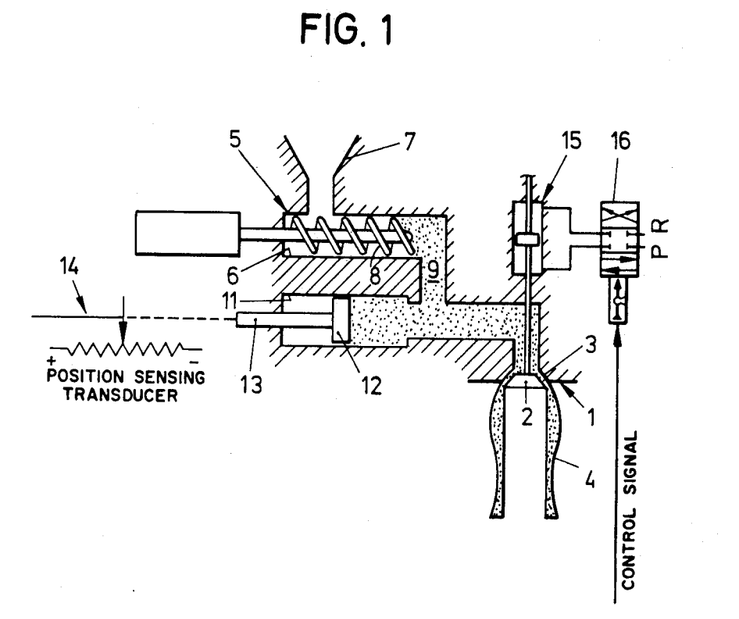
FIG. 1 is a schematic view of apparatus for extruding a parison.

The extrusion apparatus depicted in FIG. 1 includes a die head 1 with a movable mandrel or pintle 2, which forms with the die head an annular discharge opening or orifice 3 which can be varied with the axial position of the pintle relative to the die head. A plasticized extrudable material can be forced through discharge opening 3 to form a depending preform or parison 4. The parison 4 is subsequently inflated to the desired shape (i.e., a bottle, etc.) in a blow mold (not shown). A plasticizing means 5 is provided with a heated chamber 6, into which granular material may be introduced through a charging funnel 7. A rotatable screw conveyor 8 is arranged in chamber 6 and is operable to convey heated plasticized material through a channel 9 to discharge opening 3. Channel 9 communicates with an accumulator having a plunger 12 slidably mounted in a cylinder 11. Rod 13 is connected to plunger 12 and is also associated with a position sensing transducer 14, which may include a potentiometer, for producing the electrical analog of the plunger's axial position.

The pintle 2 is moved axially by a piston-cylinder actuator 15, which is supplied with pressurized fluid from electrohydraulic transducer or servovalve 16, which in turn is supplied with and controlled by a control signal. In order to form the parison 4 with desired wall thicknesses at different points along its extruded length, servovalve 16 must be supplied with a corresponding control signal during the cycle of operation.

West German Offenlegungsschrift No. 2,445,394 (corresponding to U.S. Pat. No. 3,865,528) discloses a method of producing a control signal as a polygonal procession to simulate the desired parison shape. This is based on the principle that a polygonal progression can be found by superimposing mutually-overlapping triangles of desired heights, which triangles are out of phase with one another by half the width of one triangle. The circuit disclosed in this reference makes use of an impedance matrix containing n potentiometers, which are supplied with voltage triangles in a timed sequence. In each case, two potentiometers, adjacent one another in the predetermined series, produce triangular voltages of identical amplitude, but which overlap one another by half the width of one triangle. The height of the triangles necessary to produce the polygonal procession is tapped off at the middle taps of the potentiometers.

The circuit hereinafter described, and shown in FIGS. 2–12, serves to provide the control signal supplied to servovalve 16 to produce desired movement of the pintle relative to the die head.

Figure 2:
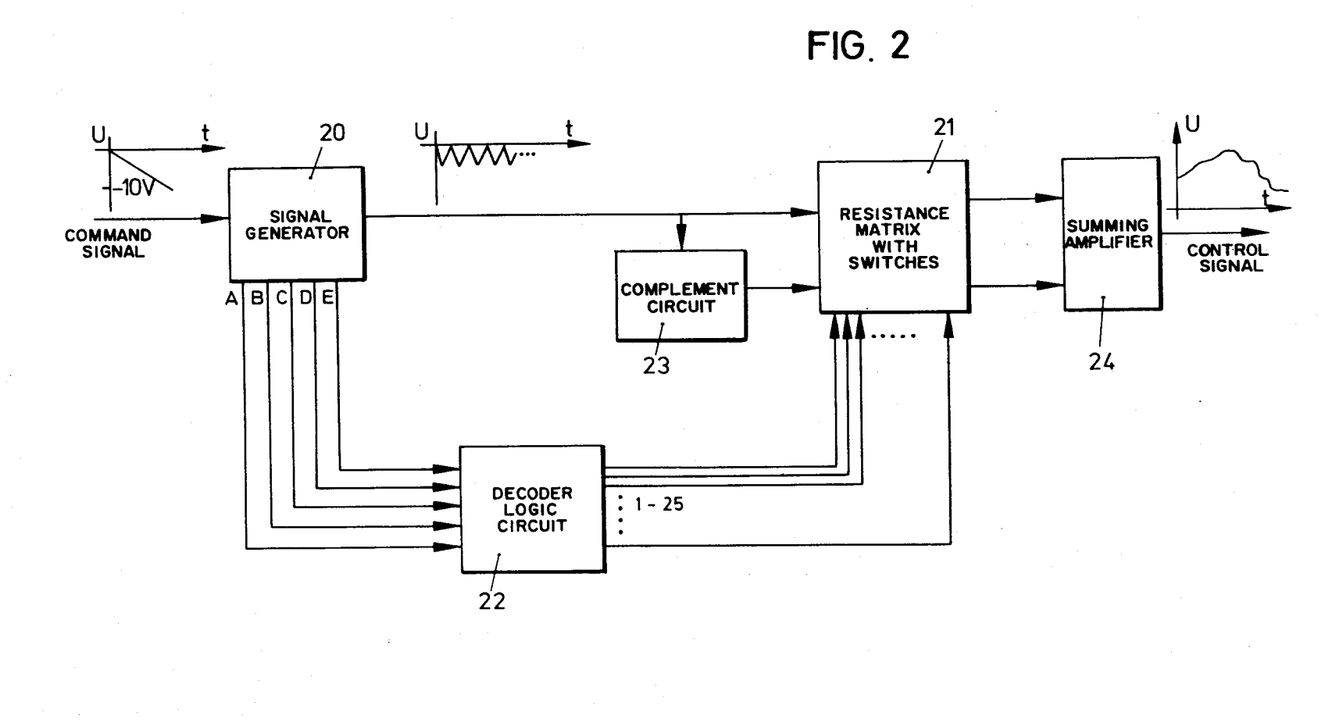
FIG. 2 is a block diagram of a first embodiment of the inventive control circuit.

Referring now to FIG. 2, the control circuit receives as an input, a command signal, which may be produced by the position sensing transducer, or is derived from it. It is also possible to produce this command signal in a separate signal generator synchronized with the movement of plunger 12. In machines in which the material is extruded directly by the rotating screw conveyor, without an accumulator (i.e., cylinder 11 with plunger 12), and without any position sensing transducer, the command signal may also be produced by a separate signal generator. The command signal is usually a timed ascending or descending signal, and this is a ramp function (see FIG. 2). The output of the control circuit is denominated a control signal, which is supplied to servovalve 16 to control movement of the pintle.

The control circuit embodiment shown in FIG. 2 includes a signal generator 20, to which the command signal is supplied. One output of the signal generator 20 is supplied to a component 21, which contains an impedance matrix and switches connected to the matrix. The other five outputs, severally identified at A–E, of the signal generator 20 are supplied to a decoder 22, the output of which is supplied to component 21. A complement circuit 23 is supplied with the output signal from the signal generator 20, and supplies another input to component 21. A summing amplifier 24 is arranged to receive the outputs from impedance matrix 21, and in turn supplies a control signal output for causing the desired movement of pintle 2.

Figure 4:
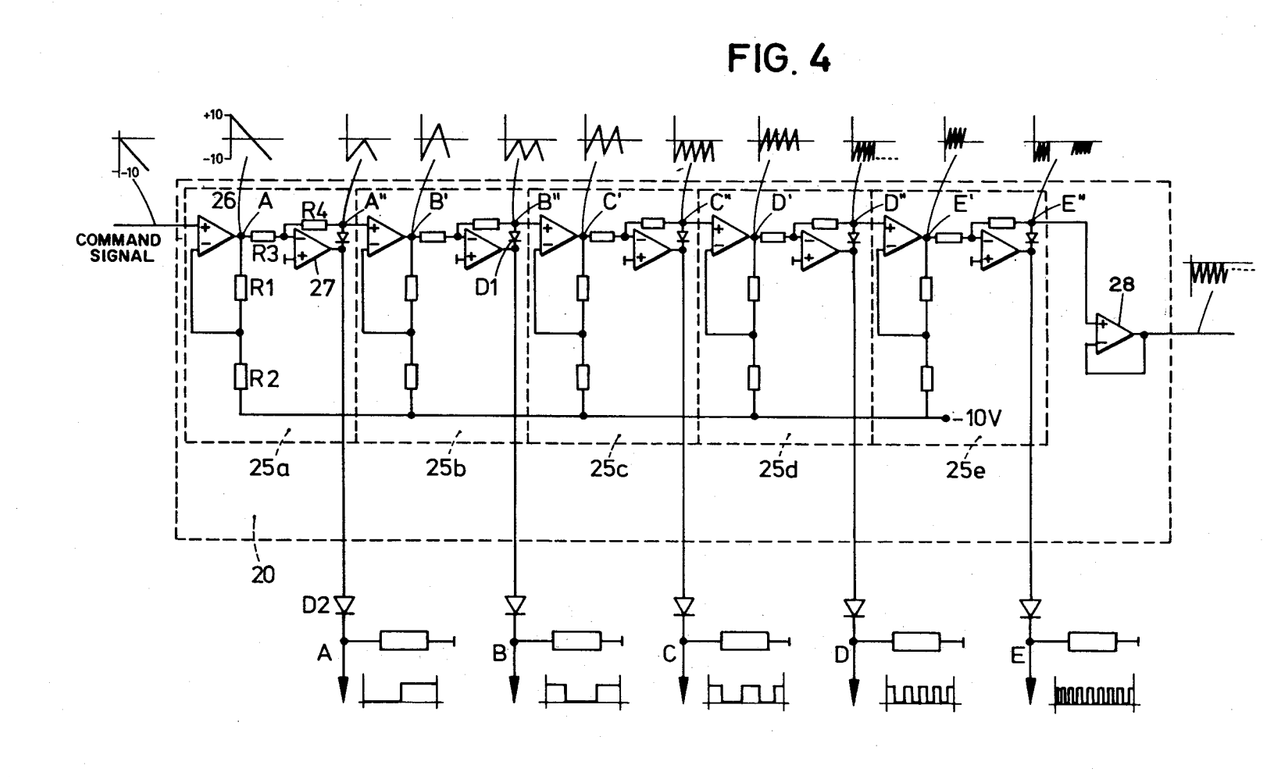
FIG. 4 is an electrical schematic of the signal generator.

As best shown in FIG. 4, the signal generator 20 includes a chain or series-connection of five identical signal converters, severally indicated at 25a–25e. Each of these signal converters contains a first operational amplifier 26, the non-inverting inlet of which serves as a signal inlet. A voltage divider, comprising two series-connected resistors R1 and R2, has one end terminal connected to the output of amplifier 26. The voltage divider has its other end terminal connected to a d.c. voltage of −10 volts. The middle tap of this voltage divider between resistors R1 and R2 is connected to the inverting inlet of amplifier 26. The outlet of amplifier 26 is connected via a resistor R3 to the inverting inlet of a second operational amplifier 27. The non-inverting inlet of amplifier 27 is grounded (0 volts). The outlet of amplifier 27 is supplied through a feedback circuit including diode D1 and resistor R4 as a feedback signal to the inverting inlet of amplifier 27. The cathode of diode D1 is connected to the outlet of amplifier 27. The non-inverting inlet of each successive signal converter 25b, 25c, 25d and 25e, is connected to the immediately preceding signal converter 25a, 25b, 25c and 25d, respectively, between the diode D1 and the resistor R4 thereof. The output signal of the last signal converter 25e in the chain, is supplied to an impedance converter 28 including an operational amplifier, the output signal of which is the actual output signal of the entire signal generator. Signal generator 20 is provided with five other outlets, severally indicated at A, B, C, D and E, which sense the signals appearing at the outlet of the amplifier 27 in each signal converter through a diode D2. The pulse signals appearing at A, B, C, D and E are supplied to decoder 22.

Figure 5:
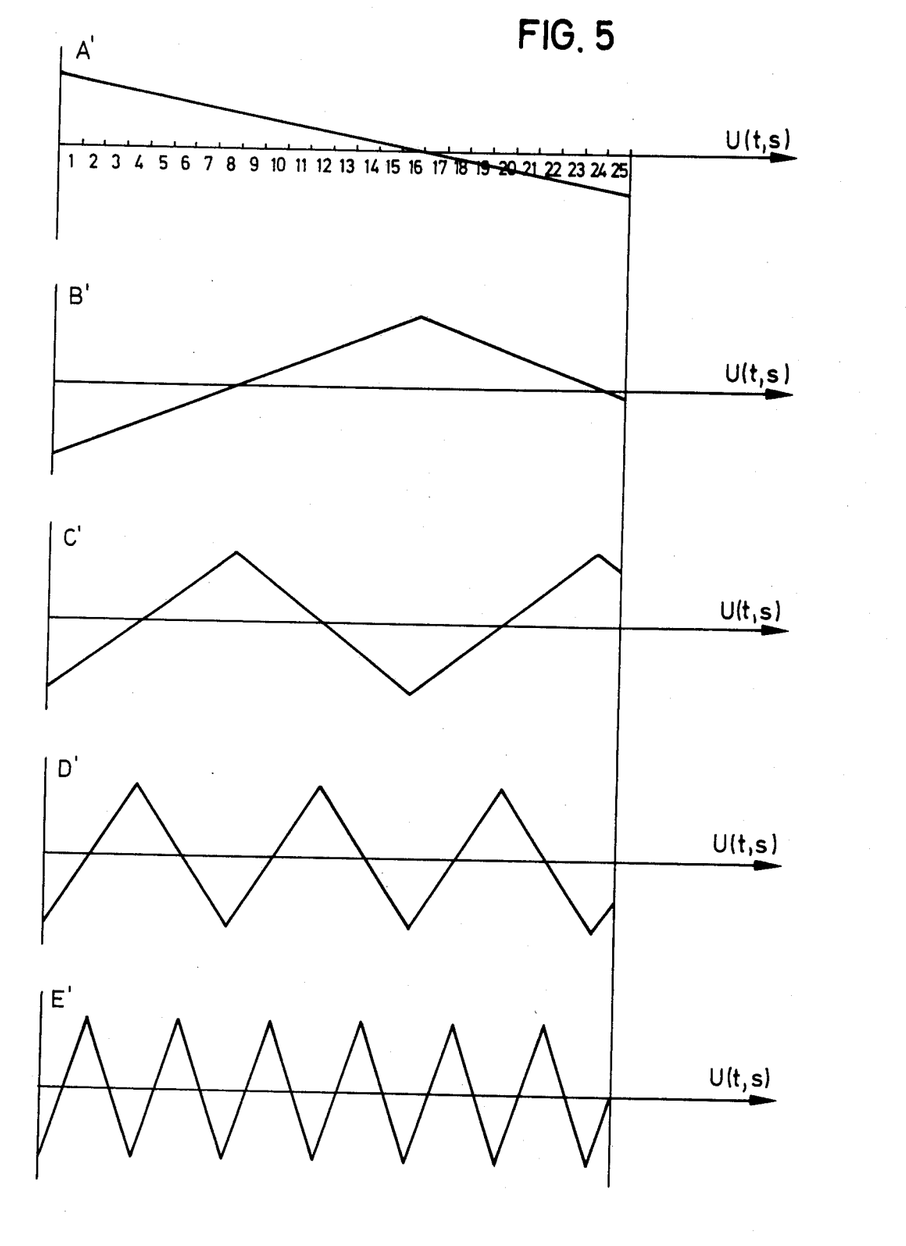
FIG. 5 shows the voltage-time curves of signals A', B', C', D' and E', which occur in the signal generator.
Figure 6:
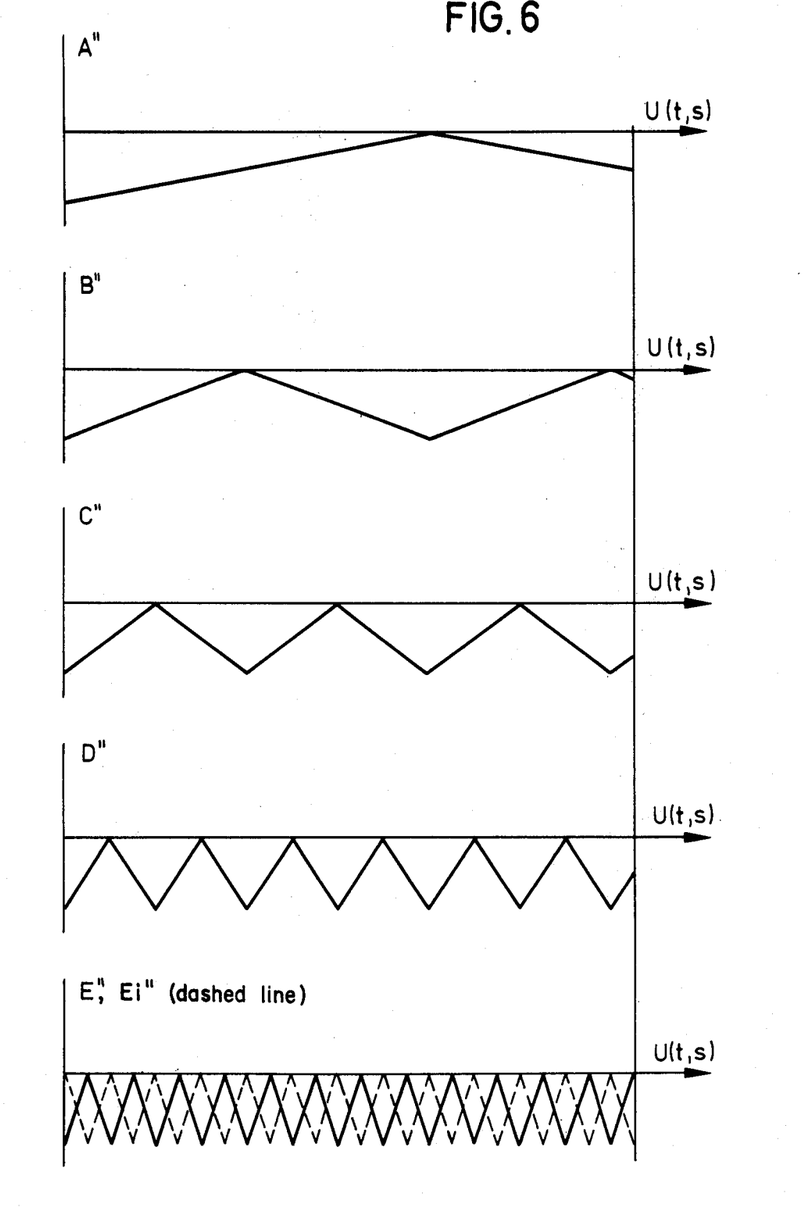
FIG. 6 shows the voltage-time curves of signals A'', B'', C'', D'', E'' and Ei'', which occur in the signal generator.
Figure 7:
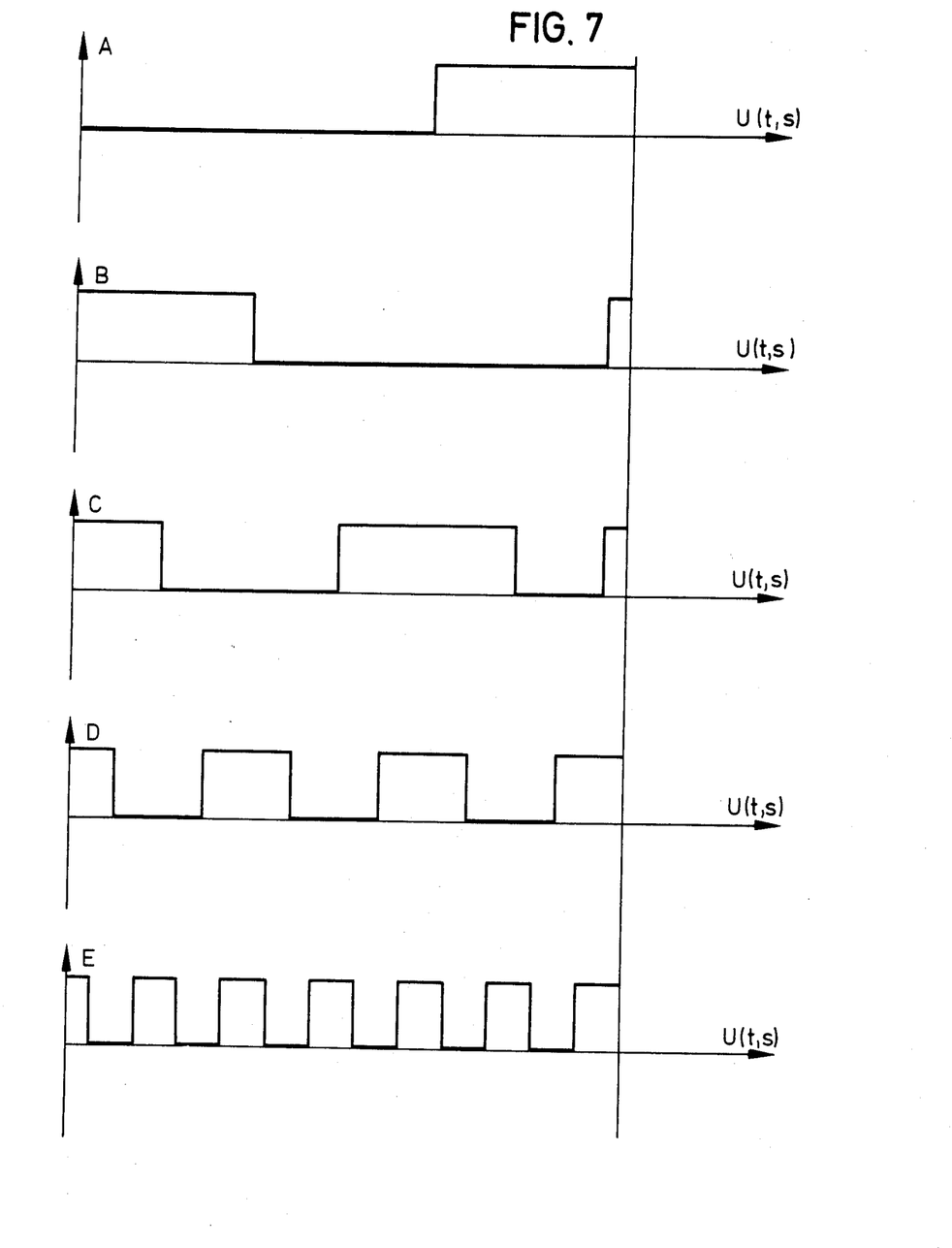
FIG. 7 shows the voltage-time curves of signals A, B, C, D and E, which occur in the signal generator.

The signals appearing at A–E, A'–E' and A"–E" are depicted in FIGS. 5–7 to facilitate an understanding of the operation signal generator 20. In FIG. 7, signals A–E appear at the cathodes of diodes D2 of the signal converters 25a–25e. In FIG. 5, signals A'–E' appear at the outlets of the amplifiers 26 of the signal converters 25a–25e. The signals indicated A"–E" (FIG. 6) appear at the anode of the diode D1 of signal converters 25a–25e.

The symmetrizing circuit including amplifier 26 functions to shift and symmetrize or balance, the level of the input signal, with respect to the abscissa or X-axis. In order to obtain signals with the most equal possible amplitude in the entire chain, it is advantageous to select the gain of amplifier 26 to be V=2. The rectifier circuit unit containing amplifier 27 acts as a full-wave rectifier. The function of these two circuit units will be hereinafter explained in detail with reference to the first signal converter 25a in the chain.

Because amplifier 26 is provided with a command signal varying from 0 to −10 volts, it produces at its outlet A' a signal varying from +10 to −10 volts. Hence, the command signal is amplified and made to be symmetrical with respect to the X-axis. This output signal is supplied to the inverting inlet of amplifier 27, which forms at the anode of diode D1, a rectified signal A" of signal A'. A positive voltage A is produced at the cathode of diode D2 if signal A' is negative. If signal A' is positive, diode D1 is in the conductive state and amplifier 27 will invert signal A'. The forward voltage of diode D1 does not affect this inversion because amplifier 27 is supplied with a degenerative feedback signal from A". Since the output voltage of amplifier 27 is negative, diode D2 is non-conductive or blocked, and voltage A will drop to zero through the resistor connected to the cathode of diode D2. If voltage A' is negative, diode D1 will be blocked, and signals A', A" will be identical. If the outlet of amplifier 27 changes to positive, diode D2 will become conductive, and a pulse voltage will be produced at A.

A triangular voltage can be produced from a ramp voltage by means of the circuit described above. If a plurality of such signal converters 25a–e are connected successively, the number of triangles is doubled as each signal converter is added. If n signal converters are connected in series, $2^{n-1}$ triangles can be produced from a ramp voltage supplied to the first signal converter. Similarly, the number of frequency of the voltage steps or pulses in digital signals A–E will also correspondingly increase. The curves depicted in FIGS. 5–7 represent the voltages appearing at A, A' and A", as a function of time, for one complete cycle of operation.

Signal E" appears at the outlet of signal generator 20. This signal E" is supplied to component 21 and complement circuit 23 in the embodiment shown in FIG. 2. Signal Ei" is the phase-shifted output of complement circuit 23, and is shown by the dashed lines in the ultimate figure of FIG. 6. Signal Ei" is out-of-phase with signal E" by half the width of one triangle.

Figure 8:
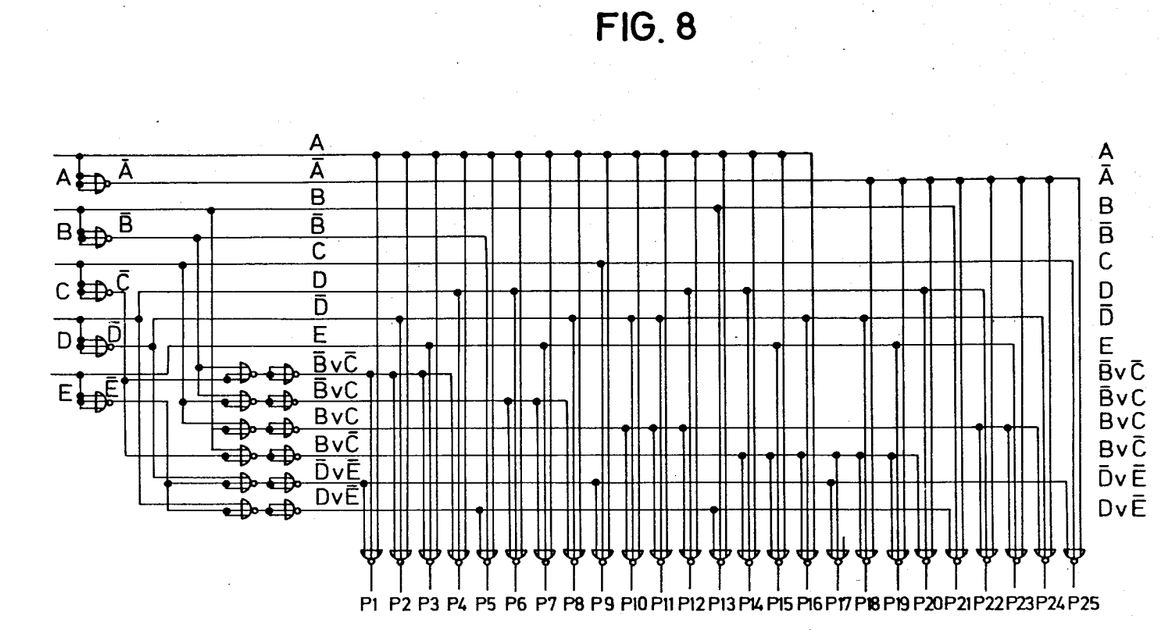
FIG. 8 is an electrical schematic of the decoder.
Figure 9:
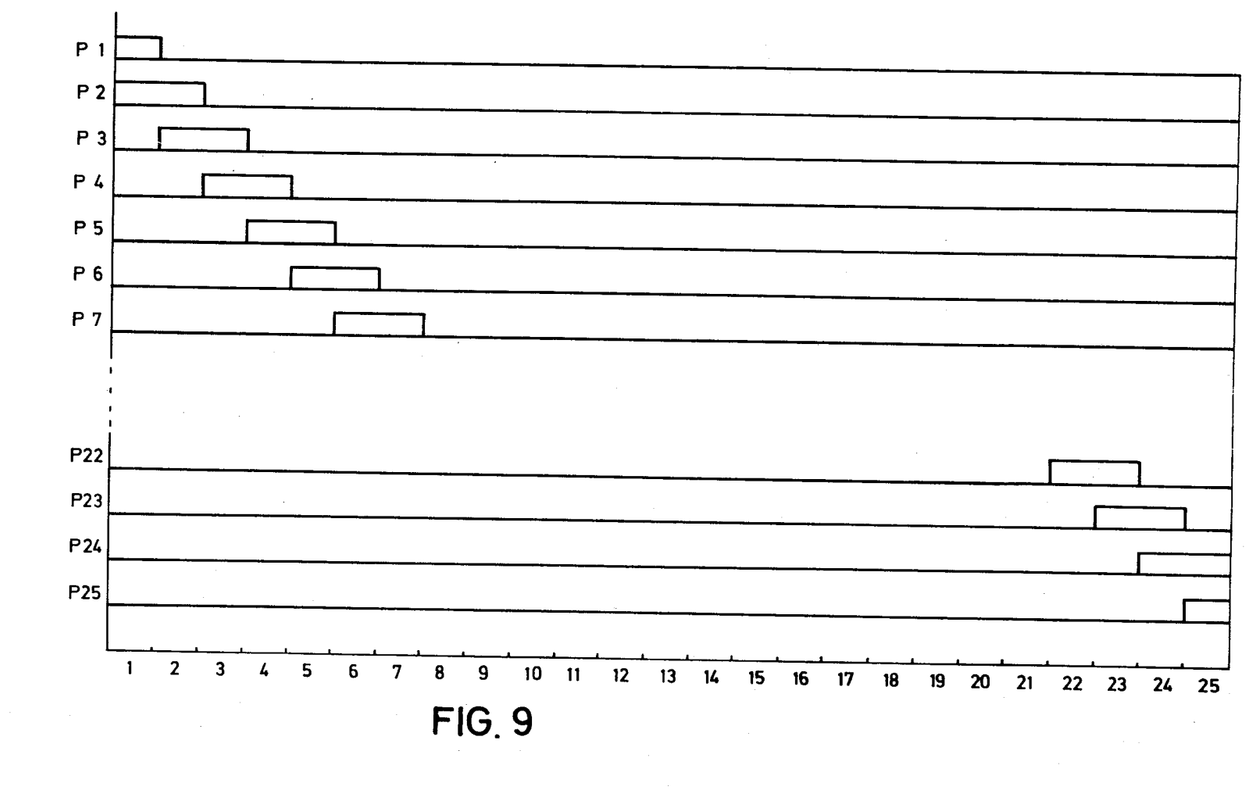
FIG. 9 shows voltage-time curves of the various overlapping pulse signals produced at decoder outputs P1–P25.

Referring now to FIG. 8, decoder 22, which is commercially available, is shown as comprising a logic circuit which is supplied with inlet signals A–E, and which produces corresponding digitally coded signals at outlets P1–P25. The relationship between input signals A–E and output signals P1–P25 is shown in Table I. FIG. 9 shows the overlapping voltages appearing at decoder terminals P1–P25, as a function of time, during one operational cycle. As the Table I and FIG. 9 show, one operational cycle is divided into 25 equal time intervals. Except for the first signal P1 and the last signal P25, successive pulses, each overlapping two time intervals, appear at decoder P1–P25. The intermediate pulses overlap adjacent pulses by one full time interval. For example, outlet P5 produces one pulse during time intervals 4 and 5. Outlet P4 produces a pulse during time intervals 3 and 4, and outlet P6 produces a pulse during time intervals 5 and 6.

Figure 10:
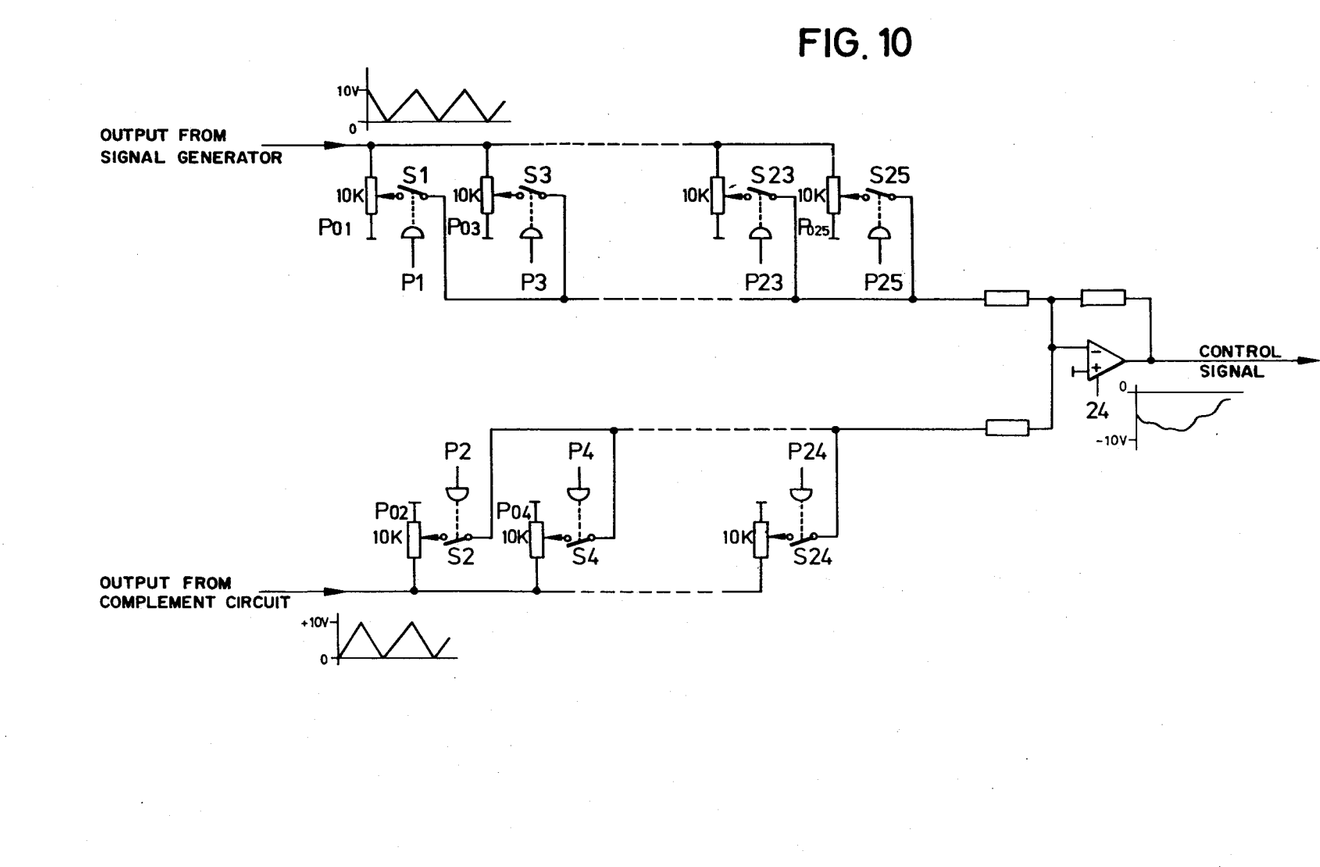
FIG. 10 is an electrical schematic of a portion of the impedance matrix, including connected switches and a summing amplifier.

In order to obtain the desired polygonal progression, the individual potentiometers of impedance matrix 21 must be provided with triangular voltages during the individual time intervals. In so doing, the descending side of one triangle may be added to or superimposed with the ascending side of the next successive triangle. This is accomplished in the aforesaid Offenlegungs-chrift No. 2,445,394, by successively controlling the triangle generators associated with each potentiometer, so that only adjacent potentiometers will receive signals. In the present circuit, however, all potentiometers are continuously supplied with input signals. As shown in FIG. 10, the odd-numbered potentiometers (i.e., Po1, Po3, Po5, . . ., Po25) are continuously supplied with the output signal from signal generator 20, while the even-numbered potentiometers (i.e., Po2, Po4, Po6, . . ., Po24) are continuously supplied with the out-of-phase output signal of the complement circuit 23. The odd-numbered potentiometers thus receive signal E", (depicted in solid in the bottom of FIG. 6), while the even-numbered potentiometers are supplied with out-of-phase signal Ei" (shown in the dashed curve at the bottom of FIG. 6). Controllable switches S1–S25 are connected to the middle taps of potentiometers Po1–Po25, respectively. These switches S1–S25 are remotely controlled by decoder output signals P1–P25. Switches S1–S25 are open when the associated decoder signal P1–P25 is zero, and are closed during the pulse intervals, as shown in Table I. All switches S1–S25 are connected to the inlets of summing amplifier 24. The selective control of these switches causes only one even-numbered potentiometer, and the odd-numbered potentiometer immediately adjacent it, to be connected to summing amplifier 24 at any point in time. It is not absolutely necessary to position the switches S1–S25 between the summing amplifier 24 and the middle taps of the potentiometers. The same result can be obtained when all middle taps are connected to summing amplifier 24 and the switches are located in the feed lines leading to the individual potentiometers.

Figure 3:
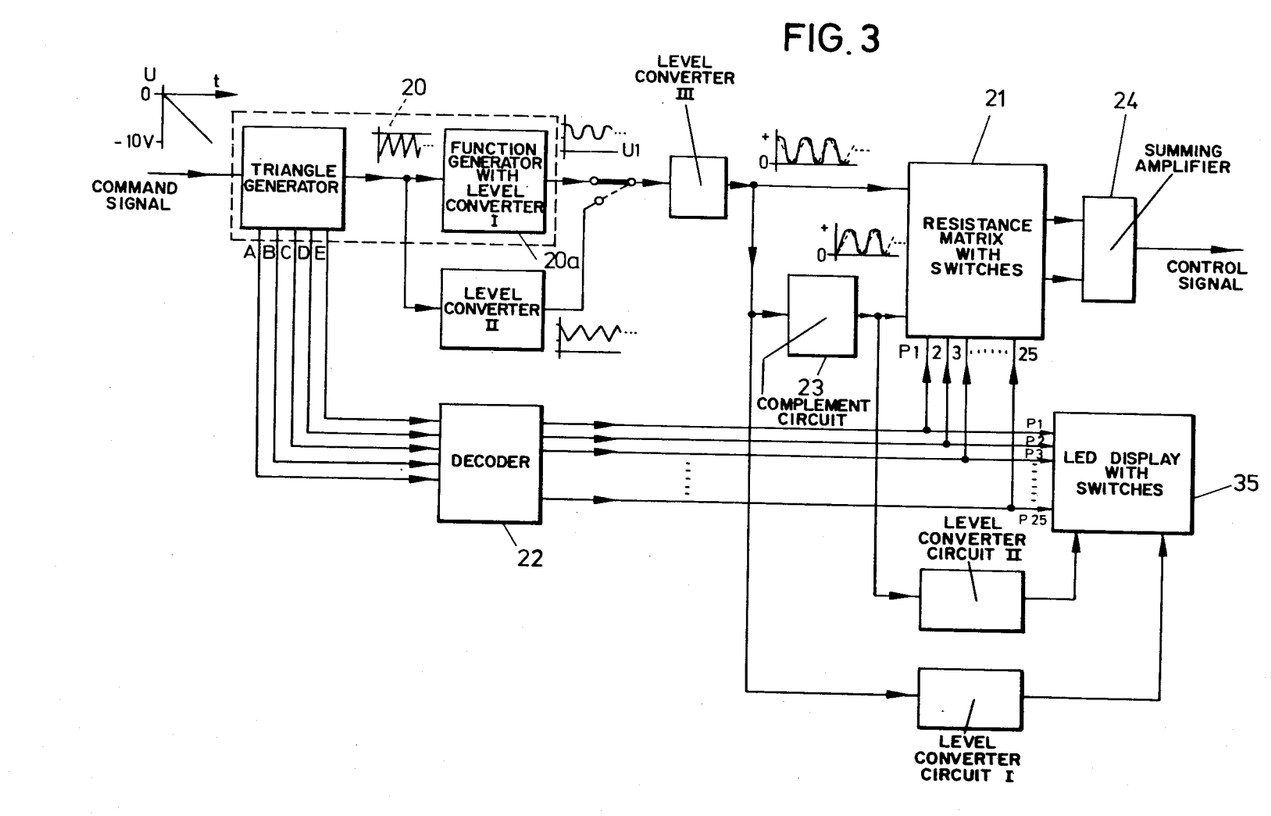
FIG. 3 is a block diagram of a second embodiment of the inventive control circuit.
Figure 13:
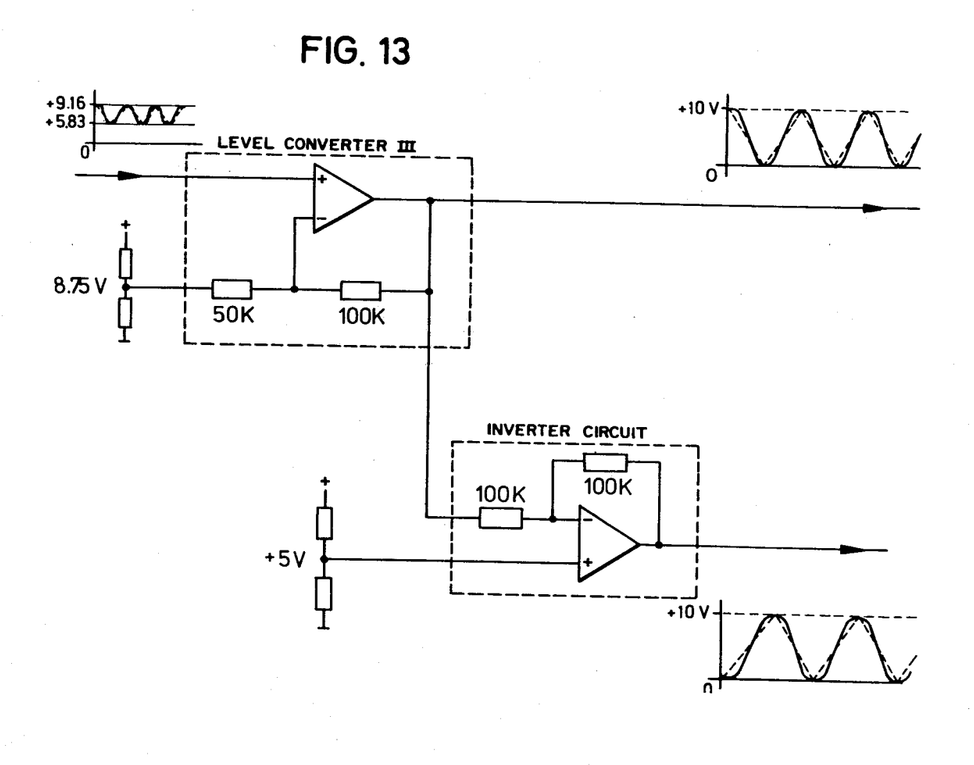
FIG. 13 is an electrical schematic of level converter III and a connected inverter circuit, these being used in the circuit embodiment shown in FIG. 3.

The embodiment illustrated in FIG. 3 differs from that shown in FIG. 2 in two principal aspects. The signal generator 20 in FIG. 3 also contains a function generator 20a, which serves to round off the voltage triangles. Integrated circuit ICL 8038 provides a satisfactory function generator. This integrated circuit contains, inter alia, a static sine wave converter which transforms a triangular wave form into a sinusoidal wave form. The use of such function generator 20a causes two successive points to be connected by an arcuate or rounded line, as opposed to a straight line (linear interpolation). If certain materials, such as polyvinyl chloride, are used as the parison material, pointed corners of the command signal can, under certain circumstances, have a disadvantageous effect on the quality of the article. As shown in FIG. 3, the sinusoidal output voltage of function generator 20a may be shifted by a level converter III in such a way that the amplitude thereof varies from zero to +1 so that, in principle, a sine squared voltage wave form is produced. In the embodiment shown in FIG. 3, a cosine squared ($\cos^2$) voltage is produced at the outlet of level converter III. A complementary sine squared ($\sin^2$) voltage is found according to the formula $\sin^2 x = 1 - \cos^2$ at the outlet of the complement circuit 23. Hence, if the middle taps of adjacent potentiometers are at the same level, the sum of the individual segments will be a constant, since $\sin^2 x + \cos^2 x = 1$. In the embodiment shown in FIG. 3, a switch U1 (FIG. 12) is provided so that the circuit may be switched from triangular operation to use with function generator 20a. Level converters I, II and III, which merely adapt the voltage, are more fully shown in FIGS. 12 and 13.

Figure 11:
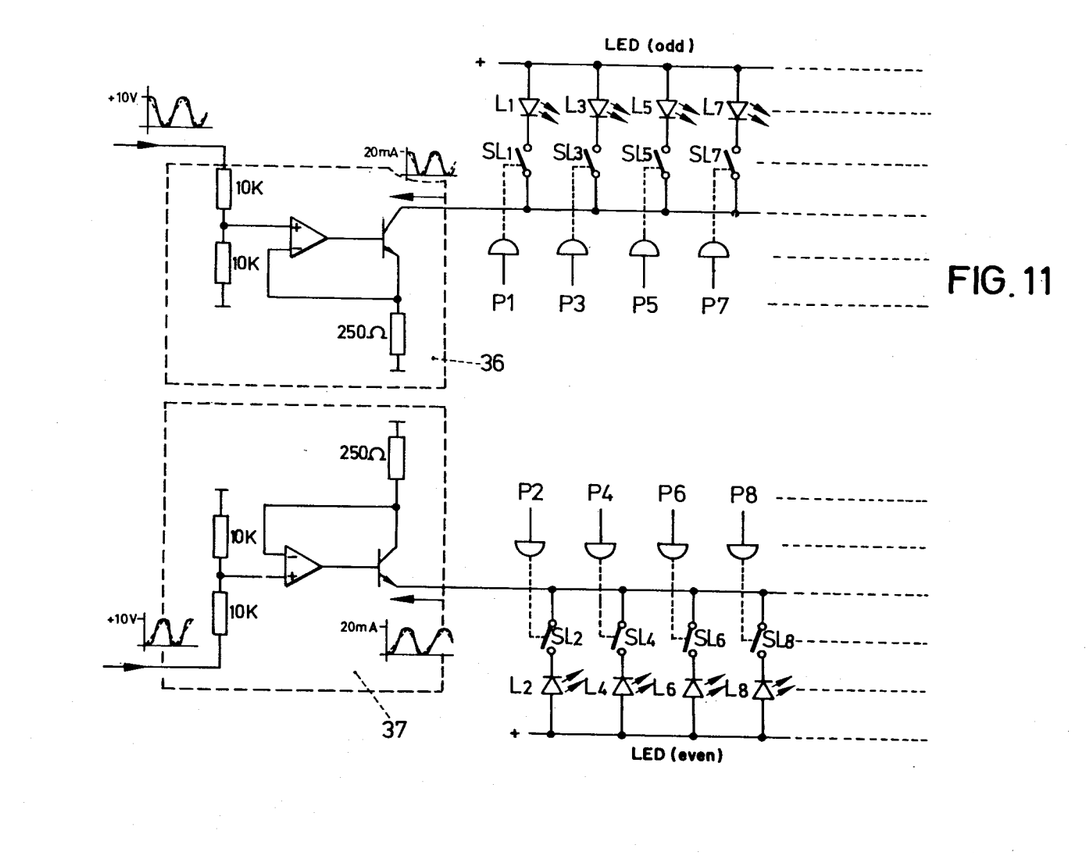
FIG. 11 is an electrical schematic of the light-emitting diode (LED) display.
Figure 12:
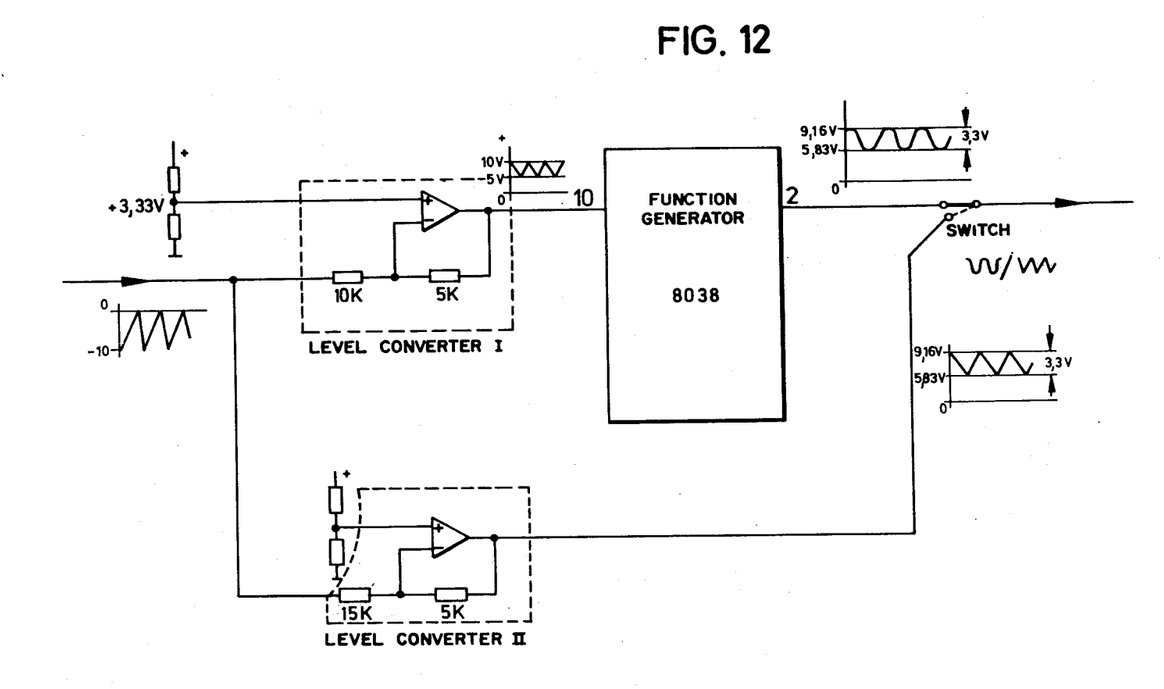
FIG. 12 is an electrical schematic of level converters I and II and a connected function generator, these being used in the circuit embodiment shown in FIG. 3.

Another difference of the embodiment shown in FIG. 3 over that shown in FIG. 2, is the provision of LED display circuit 35. This LED display circuit 35 receives the same input signals as circuit unit 21. Because the luminescence of the LED's is generally proportional to the forward current, and because the resistance of the LED's is not constant, the different forward resistances of switches SL1–SL25 (FIG. 11) do not affect the current through the LED's and do not affect their luminescence. The LED's are activated by an impressed current (e.g. sine or triangular wave form). As best shown in FIG. 11, level converters 36 and 37 convert the triangular or sinusoidal input voltages from impedance matrix 21 into proportional currents for the LED's. LED's L1—L25 receive current whenever the middle tap of the associated potentiometer PO1–PO25 is connected to the summing amplifier 24. Thus, an optical display of the program sequences is obtained when the LED's are arranged next to one another in the same sequence as the numerical order. The controls for the potentiometers can be advantageously located in the vicinity of the LED's. Another advantage of using LED's is that the display exhibits a gradual transition. As one LED gradually becomes dimmer, the adjacent LED becomes progressively brighter. The total current through both LED's remains constant.

Therefore, while preferred embodiments of the inventive circuit have been shown and described, persons skilled in this art will appreciate that various additional changes and modifications may be made without departing from the spirit of the invention, as defined by the following claims.

What is claimed is:

1. A signal generator arranged to be supplied with a command signal and operative to produce a first output signal in the form of a series of continuous voltage triangles, said signal generator comprising:
   at least one signal converter, each signal converter having
   a level symmetrizing circuit arranged to receive said command signal input and operative to amplify and symmetrize said command signal input, said level symmetrizing circuit including a first operational amplifier arranged to receive an input signal at its non-inverting inlet; and
   a rectifier circuit arranged to receive the output of said level symmetrizing circuit and operative to provide a full wave rectified signal of such amplified and symmetrized signal; said rectifier circuit including a second operational amplifier arranged to receive a signal at its inverting inlet and having its non-inverting inlet connected to ground, and including a feedback circuit connecting the outlet and inverting inlet of said second operational amplifier, said feedback circuit including a series-connected diode and resistor, the cathode of said diode being connected to the outlet of said second operational amplifier.

2. A signal generator as set forth in claim 1 wherein said signal generator comprises a plurality of said signal converters, connected as a chain, such that the output signal from the rectifier circuit of the preceeding signal converter will be supplied as an input signal to the level symmetrizing circuit of the next subsequent signal converter.

3. A signal generator as set forth in claim 1 wherein said level symmetrizing circuit further comprises:
   a voltage divider having a pair of series-connected resistors, said voltage divider having one end connected to a voltage source, having its other end connected to the outlet of said first operational amplifier, and arranged to supply a divided voltage from a point intermediate said resistors to the inverting inlet of said first operational amplifier.

4. A signal generator as set forth in claim 1 comprising:
   a plurality of said signal converters, connected as a chain, such that the signal appearing at the anode of said diode is supplied as an input signal to the level symmetrizing circuit of the next sequential signal converter.

5. A signal generator as set forth in claim 1 and further comprising:
   a pulse circuit associated with the rectifier circuit of each signal converter for producing a rectified pulse corresponding to the signal appearing at the outlet of said second operational amplifier, said pulse circuit including a second diode having its anode connected to the outlet of said second operational amplifier.

* * * * *